Patented Dec. 28, 1937

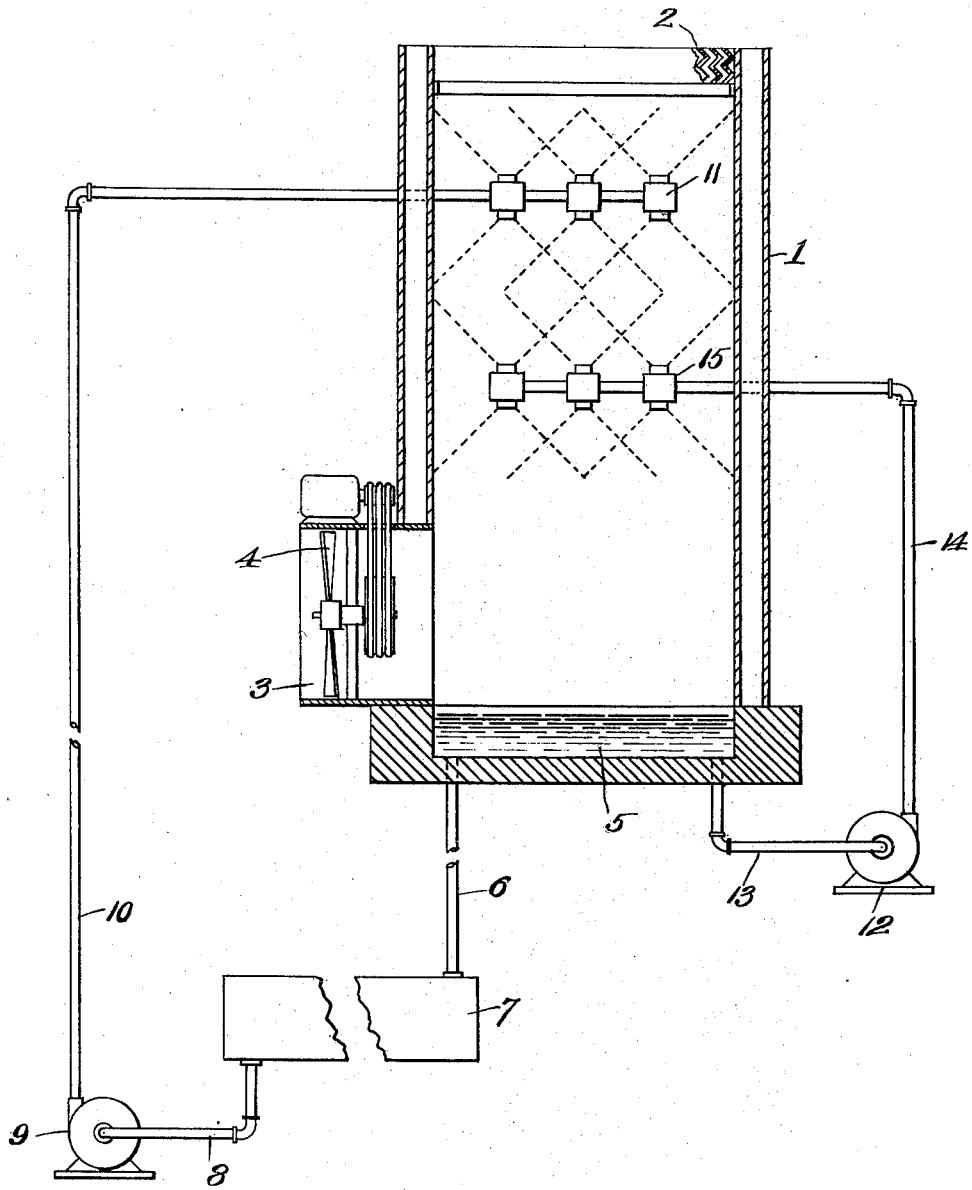

2,103,542

UNITED STATES PATENT OFFICE 2,103,542

PROCESS FOR COOLING LIQUIDS

Leon T. Mart, Johnson County, Kans., assignor to The Marley Company, Kansas City, Mo. a corporation of Missouri Application August 12, 1935, Serial No. 35,836

1 Claim. (Cl. 62—177)

This invention relates to cooling towers and has for its general object to increase the efficiency of a cooling tower above the average for a standard tower of correponding dimensions and equipment, through the recirculation, of all or of a part, of the liquid through the tower.

The process may be carried out by any suitable apparatus, the process being peculiarly adapted for boosting the over-all efficiency during a time of peak load, and may thus be employed to advantage in reducing the original cost and operating expense of water cooling equipment for refrigerating service, air-conditioning service, or the like, in tall office buildings, apartments and industrial establishments and the like, although its use, of course, is not restricted thereto. In installations made in tall structures, the apparatus, pipes, pumps, tower and the like must be designed to meet peak load conditions, and consequently during the greater part of the operating season, the equipment is not operating at any where near its capacity. With the process of the present invention, the equipment installed may be reduced in size in all of its parts, with a consequent material saving in original investment and in operating costs, auxiliary recirculating equipment being provided for use during peak periods to cool the liquid or water in the cooling tower to a lower point than is possible with the ordinary equipment of corresponding capacity.

The great economic advantage of such a boosting system will be obvious without further particularization, the process of the invention being adaptable for all types of cooling towers, and the equipment being designed to recirculate all or only a fraction of the total water to be handled through the cooling tower.

With the general objects named in view and others as will hereinafter appear, the invention consists in certain novel and useful methods of operation as hereinafter described and claimed; and in order that it may be fully understood, reference is to be had to the accompanying drawing, in which one arrangement of apparatus suitable for carrying out the process is illustrated.

In said drawing, 1 is a cooling tower which is shown as of the free-fall type, that is, there are no internal baffles or the like to interrupt the gravitation of the water. The tower is provided at its upper end with a drift eliminator 2 and at its lower end is provided with an air inlet opening 3 in which a fan 4 is mounted for forcing air into the tower and out at its upper end, although the fan could be mounted at the top of the tower for induced draft if desired. The tower, as customary, is mounted above a pond or catch basin 5.

Frequently towers of this kind, are mounted on the roof of the building, and such an installation is shown, the cooling tower pond being connected by a cold water return line 6 down through the building to heat exchanger or condensing apparatus and their associated mechanism or the like, 7. The hot water discharged by the latter equipment flows through a line 8 to a pump 9 by which it is returned to the building roof through a pipe line 10. The pipe line 10 discharges its water into the upper end of the cooling tower through any suitable sort of water distributing system to evenly divide the water in finely divided form over the cross-sectional area of the tower, the distributing system, in the present instance, being shown as in the form of double discharging spray nozzles 11, although any other desired arrangement of nozzles or apparatus may be utilized.

The apparatus as thus described is common and it has been found necessary to make the tower, pipe lines and the like of sufficient size to handle the entire volume of water necessary at peak loads and under the worst atmospheric conditions. Theoretically, in cooling tower work, the desideratum is to discharge the air from the tower at the same temperature as that of the water when delivered to the tower, as this would spell most efficient operation, but, in practice, this result is impossible to attain. However, I have found if apparatus is provided to deliver a greater volume of water to the tower, or to expose the water again to the air stream at a point where the air is relatively cool, that the total volume of water will be cooled to a lower temperature than would otherwise be possible. This might be accomplished by a number of different types of apparatus, but the simplest form is illustrated in the present case, as follows:

Mounted in close proximity to the tower is a liquid pump 12, which is connected by pipe line 13 to the catch basin or pond from which it pumps water and discharges it through a pipe line 14 to a series of spray nozzles 15, of any desired type, or to other water distributing apparatus, arranged intermediate the height of the tower. The pump may be arranged to handle, either the entire volume of water flowing through the apparatus, or any proportion thereof. Since the recirculated water is cooler than the water initially delivered through the pipe line 10, it is preferable that this recirculated water contact the flowing air before the latter has been warmed materially by contact with the water discharged at the top of the tower. With such process it is apparent that the water in the pond or collecting basin will be cooled to a lower temperature than would otherwise be possible, other things remaining constant. Consequently, at peak periods, through the operation of the auxiliary apparatus, it is possible to return water through the return line 6 at a lower temperature than could be done without a variable speed fan or other similar apparatus, the lower temperature counter-balancing the greater volume of water which would be necessary if returned at a higher temperature. Thus, it is apparent that the apparatus as originally designed, could be made of smaller size in all of its parts to reduce original cost, and that as the volume of water being handled through the greater part of the operating season would be less, the cost of operation would also be reduced, the auxiliary apparatus only being operated at peak periods when atmospheric conditions required its operation.

It is to be noted that the boosting apparatus could be very conveniently arranged for remote control, and that such control mechanism could be operated either manually or automatically as by thermostat or the like, in accordance with water or atmospheric temperatures.

From the above description, it will be apparent that while I have described the process and one form of preferred apparatus capable of performing the process, it is to be understood that I reserve the right to all changes within the spirit of the invention and without the ambit of the prior art.

I claim:—

The method of cooling water for and applying same to an industrial use, consisting in delivering hot water from a heat exchange system to a cooling tower, discharging said water into the cooling tower adjacent the upper end thereof, collecting the water in a collecting basin, returning a predetermined volume flow from the collecting basin to the heat exchange system, and finally, when the temperature of the water in the collecting basin exceeds a desired maximum, withdrawing a secondary flow of water from the collecting basin without effecting a change in the return volume flow to the heat exchange system, and returning such secondary water flow to the cooling tower at a point below the hot water discharge for recooling such secondary water flow to effect a lowering of the overall temperature of the water in the collecting basin.

LEON T. MART.